US009185562B2

(12) United States Patent
Reddy et al.

(10) Patent No.: US 9,185,562 B2
(45) Date of Patent: Nov. 10, 2015

(54) COORDINATION OF MULTIPATH TRAFFIC

(71) Applicant: Cisco Technology, Inc., San Jose, CA (US)

(72) Inventors: Tirumaleswar Reddy, Bangalore (IN); Prashanth Patil, Bangalore (IN); Daniel Wing, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 66 days.

(21) Appl. No.: 13/944,607

(22) Filed: Jul. 17, 2013

(65) Prior Publication Data

US 2015/0026756 A1    Jan. 22, 2015

(51) Int. Cl.
*H04L 29/06*  (2006.01)
*H04W 12/08*  (2009.01)
*G06F 15/16*  (2006.01)

(52) U.S. Cl.
CPC .............. *H04W 12/08* (2013.01); *H04L 29/06* (2013.01); *G06F 15/16* (2013.01); *H04L 63/10* (2013.01); *H04L 63/20* (2013.01)

(58) Field of Classification Search
USPC .................. 726/1, 22–25, 3; 713/187–188
See application file for complete search history.

(56) References Cited

U.S. PATENT DOCUMENTS

| 7,761,500 | B1 * | 7/2010 | Eckert et al. | 709/203 |
| 2010/0238840 | A1 * | 9/2010 | Lu et al. | 370/259 |
| 2011/0276713 | A1 * | 11/2011 | Brand | 709/232 |
| 2013/0263117 | A1 * | 10/2013 | Konik et al. | 718/1 |

OTHER PUBLICATIONS

A. Ford et al., Architectural Guidelines for Multipath TCP Development, Mar. 2011, RFC 6182, Internet Engineering Task Force (IETF).
A. Ford et al., TCP Extensions for Multipath Operation with Multiple Addresses, Oct. 22, 2012, Internet Engineering Task Force.
B. Wellington, Secure Domain Name System (DNS) Dynamic Update, Nov. 2000, RFC 3007, Network Working Group.
J. Metzler, The 2009 Handbook of Application Delivery, A Guide to Decision Making in Challenging Economic Times, Mar. 2009, www.webtorials.com.
P. Amer et al., Load Sharing for the Stream Control Transmission Protocol (DCTP), Mar. 26, 2013, Network Working Group.
P. Vixie et al., Dynamic Updates in the Domain Name System (DNS Update), Apr. 1997, RCE 2136, Network Working Group.

(Continued)

*Primary Examiner* — Brandon Hoffman
*Assistant Examiner* — Samuel Ambaye
(74) *Attorney, Agent, or Firm* — Lempia Summerfield Katz LLC

(57) ABSTRACT

In one implementation, traffic in a mobile network is directed across multiple paths to a single cloud server or security server (e.g., a security as a service). The mobile device detects a cloud connector through a primary connection based on an attachment or connection via a first interface of a mobile device. The mobile device sends a request to the cloud connector for an identification of a cloud security server associated with the cloud connector. After receiving the identification of the cloud security server, the mobile device directs one or more subsequent data flows or subflows for a second interface or another interface of the mobile device to the cloud server or security server. The second data flow and the second interface are associated with another network that is external to the enterprise network and trusted network connection or not associated with the enterprise network and the trusted network connection.

16 Claims, 6 Drawing Sheets

(56) References Cited

OTHER PUBLICATIONS

S. Cheshire et al., DNS-Based Service Discovery, Dec. 9, 2011, Internet Engineering Task Force.

S. Vlastra, No Boundaries with Blue Coat Unified Web Security Solutions, Accessed Apr. 18, 2013, Blue Coat.

V. Singh et al., Multipath RTP (MPRTP), Jan. 11, 2013, AVT Core Working Group.

* cited by examiner

COORDINATION OF MULTIPATH TRAFFIC

TECHNICAL FIELD

This disclosure relates in general to the field of mobile data traffic, and more particularly, to multipath mobile data traffic.

BACKGROUND

The transmission control protocol (TCP) is now decades old. TCP has undergone countless revisions, improvements, and upgrades. However, the core concept, that a connection between two hosts is singular, has remained unchanged. The packets are turned over to the routers to take multiple routes to the destination, but in TCP there is only a single connection between the two hosts.

Mobile data traffic, which refers to data traffic over mobile networks (e.g., cellular networks), has grown exponentially since the inception of TCP. Current mobile data traffic is twelve times the entire global internet traffic from the year 2000, and the number of mobile connected devices is projected to exceed the population of the world. The amount of mobile data traffic is expected to continue to increase at exponential rates in the future.

Recent strategies have been developed to take advantage of the exponential growth of mobile data availability to improve TCP connections. For example, two TCP connections may provide parallel paths between hosts.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
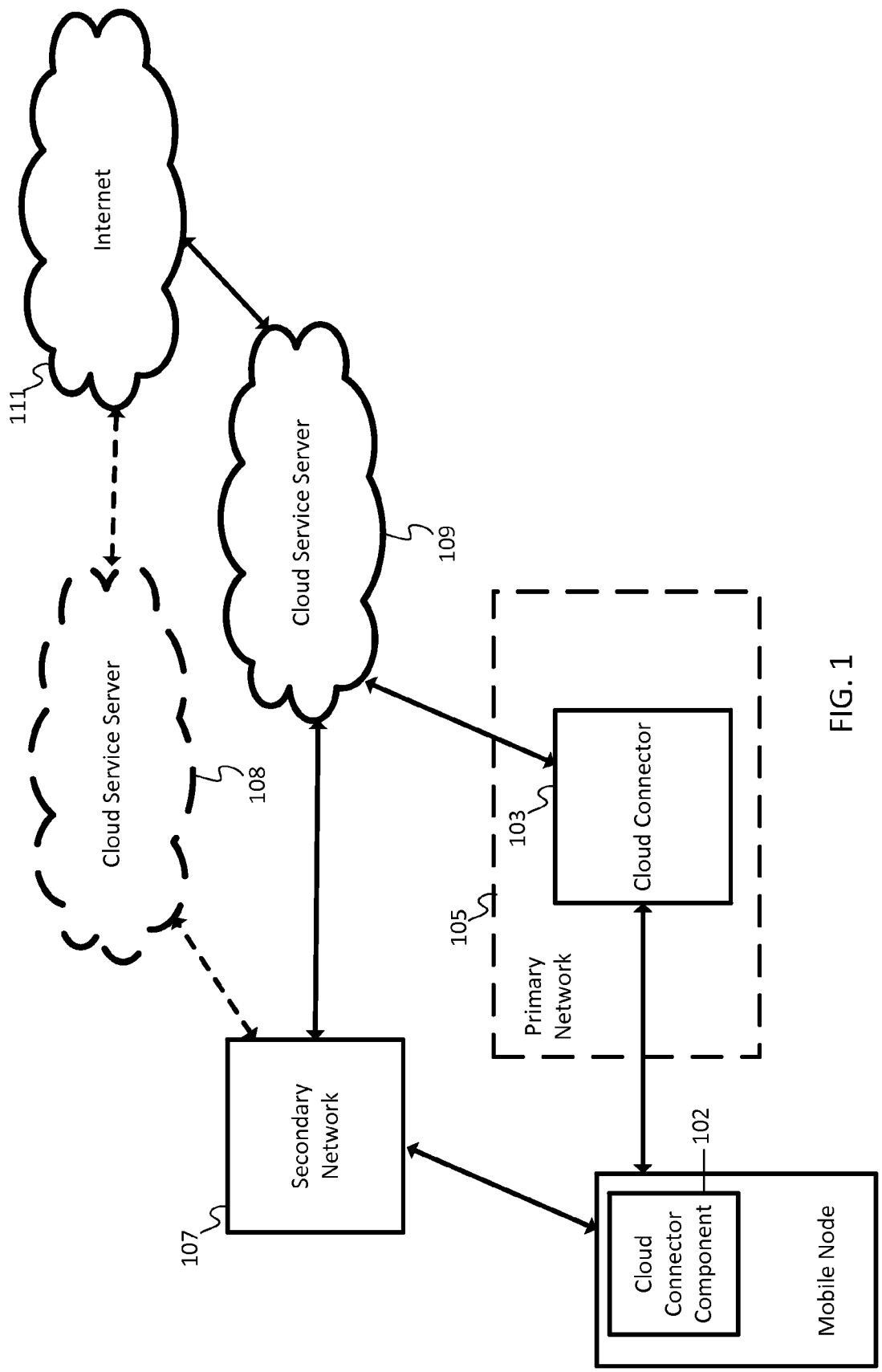
FIG. 1 illustrates an example system for multipath communication.

In one embodiment, a method includes connecting to a primary network through a primary interface of a mobile device, identifying a cloud connector through the primary interface of the mobile device, sending, using the primary interface, a request to the cloud connector for an address of a cloud security server associated with the cloud connector, receiving the address of the cloud security server, and directing a subflow from a secondary interface of the mobile device to the cloud security server through a complementary network.

In another embodiment, a method includes receiving a first data flow for a mobile device through a cloud connector, receiving a second data flow for the mobile device through an a different service provider, performing an analysis of data packets from the first data flow in combination with data packets from the second data flow, and providing a cloud service for the mobile device based on the analysis of data packets from the first data flow in combination with data packets from the second data flow.

EXAMPLE EMBODIMENTS

A multipath communication protocol provides for parallel and simultaneous communication on multiple communication paths and/or multiple types of communication. Multiple paths provide more bandwidth than a single path so that more data can be transmitted. Example types of communication include Wi-Fi, Ethernet, cellular, Bluetooth, universal serial bus (USB), or other modes of data communication. As two or more of these types of communication transmit data in parallel for a communication session, performance of the communication session is improved.

Example multipath communication protocols include multipath transmission control protocol (TCP), multipath stream control transmission protocol (SCTP), and multipath real-time transport protocol (RTP). MPTCP may be defined by Request for Comments (RFC) 6182 as published March 2011 and available at http://tools.ietf.org/html/rfc6182. MPTCP is a modified version of TCP that implements a multipath transport and achieves these goals by pooling multiple paths within a transport connection, transparently to the application. Multipath SCTP may be defined by "Load Sharing for the Stream Control Transmission Protocol (SCTP)," published March 2013 and available at http://tools.ietf.org/html/draft-tuexen-tsvwg-sctp-multipath. Multipath RTP, which utilizes multiple paths for a control channel for real-time content, may be defined by the draft "draft-singh-avtcore-mprtp-06" published January 2013 and available at http://tools.ietf.org/html/draft-singh-avtcore-mprtp-06. However, other communication protocols may be adapted for multipath communication.

The use of multipath communication protocol introduces problems not experienced in single path communication. For example, a network may utilize a cloud based security service or another type of Security as a Service (SecaaS) to enforce usage policies and prevent malicious software. Multiple SecaaS servers may be located around the world and may be provided based on geographic location or as specified in a license.

A router of the network may be configured to direct traffic to a specific SecaaS server as the primary server. In addition, if connectivity fails, the router may be configured to direct traffic to another SecaaS server as the secondary server. However, if part of the communication session is transmitted outside of the local network and not subjected to the cloud based security service, that portion of the communication session may not be regulated. Further, even if the part of the communication session that is transmitted on another network is subjected to a different cloud based security service, the two portions of the communication session are not correlated by the cloud based security service.

For example, some of the security services are not effective if the two portions of the communication session are not correlated. For example, consider a mobile device using a multipath communication protocol (e.g., Multipath TCP as defined by RFC 6182) such that part of a communication session (subflow A) is transmitted over Wi-Fi and a local network in parallel with another part of the communication session (subflow B) transmitted over a cellular network. The local network sends the first part of the communication session to one security server (e.g., proxy1111.secaas.net), and the cellular network sends the second part of the communication cation session to another security server (e.g., proxy2222.secaas.net).

In other words, the first security server receives only subflow A and the second security server received only subflow B. Because neither server correlates the subflows, neither server has the information to provide security functions such as deep packet inspection, behavioral analysis, heuristics, or application Identification. For example, if the communication session includes malicious software, part of the malicious software may be transmitted through the first security server and part of the malicious software may be transmitted through the second security server. Thus, both security servers receive only partial content, and neither security server may receive enough content to identify the content as malicious.

FIG. 1 illustrates an example system for multipath communication. The system for multipath communication includes a primary network 105 and a secondary network 107. The mobile device 101 communicates with the primary network 105 on one interface and/or one type of communication and communicates with the secondary network 107 on another interface and/or another type of communication. In one example, the primary network 105 is a wired network (e.g., Ethernet) or a wireless network (e.g., Wi-Fi), and the secondary network 107 is a cellular network or vice versa.

The mobile device 101 may be a laptop computer, a mobile phone, a smart phone, a tablet computer, or any computing device with multiple communication interfaces. The mobile device 101 may be a secure mobility device running a secure mobility client. A secure mobility client is configured to provide a secure communication to any device, including unknown devices, on a trusted network (e.g., enterprise network) or on an untrusted network (e.g., a hot spot, public Wi-Fi, hotel network, or airport network). The secure mobility client is also configured to enforce security policies in cooperation with cloud services. The secure mobility client may re-direct traffic to the cloud based security server. An example secure mobility client includes AnyConnect of Cisco Systems Inc. of San Jose, Calif.

The mobile device 101 may be a "visitor" to the primary network 105. In these so-called "bring your own device" networks, users may bring an unrecognized laptop, tablet, smartphone, or other device and gain access to the enterprise network with an authenticated login and password.

The primary network 105 includes a cloud connector 103. The cloud connector 103 may be an integrated service router or an aggregated service router. The cloud connector 103 may be software implemented by a router. The cloud connector 103 facilitates the delivery of cloud services and applications. The cloud connector 103 may be configured to intelligently direct data traffic to the cloud service server 109 to enforce security policies and/or acceptable use policies over the data traffic. In addition, all data traffic may be routed to the cloud service server 109 in order to examine the data traffic for malicious software or messages, deep packet inspection, heuristics, identity based enforcement, application identification, or other services.

The mobile node 101 is coupled to the Internet 111 through both the primary network 105 and the secondary network 107. The security mobile client of the mobile device 101 may detect the trusted network connection after the point-of-attachment. That is, after the mobile device 101 is assigned an IP address from the primary network 105, the secure mobility client of the mobile device 101 immediately probes the primary network 105 to determine if the primary network 105 is trusted or untrusted.

The secure mobility client of the mobile device 101 may detect the cloud connector 103 through the trusted network connection by probing the network after the point of attachment in response to assignment an IP address to the mobile device 101. The detection of the trusted network may be based on a domain name system (DNS) lookup (e.g., DNS suffix). For example, the secure mobility client may determine that the primary network 105 is a trusted network through accessing a lookup table of trusted DNS suffixes using an address of the primary network 105. Other techniques for the trusted network detection may include an internal server. For example, the security mobility client may be configured to connect to the internal server using HTTPS to receive a server certificate. If the internal server is reachable and the server certificate matches a configured profile, the security mobility client concludes that the internal server is on the trusted network.

The secure mobility client may also detect the presence of the cloud connector 103. The detection of the cloud connector 103 may be through DNS-based service discovery. When the mobile device 101 is a guest device or visiting client on the primary network 105, the security mobility client is configured to discover what services are available on that network. The discovery may occur automatically and without any manual configuration.

The cloud connector 103 in the primary network 105 is configured to register the following records: pointer (PTR) type for service type "_cloudconnect._tcp.<domain>", service (SRV) type for "<instance>._cloudconnect._tcp.<domain>", A/AAAA type to map hostnames to an IP address of the cloud connector 103 and the port number where the cloud connector 103 is listening for incoming connections from secure mobility clients. Secure Mobility client attempt to discover the cloud connector 103 being advertised by sending PTR query "cloudconnect._tcp.<domain>".

Example DNS based service discovery is described in "DNS-Based Service Discovery," published December 2011 and available at http://tools.ietf.org/html/draft-cheshire-dnsext-dns-sd-11. The dynamic DNS update that is used for service registration is described in RFC2136 as published in April 1997 and available at http://www.ietf.org/rfc/rfc2136.txt as well as RFC3007 published November 2000 and available at http://www.ietf.org/rfc/rfc3007.txt. The secure mobility client is configured to learn the domain search list using DHCP after the point of attachment to the primary network.

The secure mobility client establishes a secure communication channel with the cloud connector 103 for information exchange. The secure communication channel may be an authenticated and/or integrity protected signaling channel. An authenticated security channel may be established through digital signatures and/or a public key infrastructure. The digital certificate may be created by generating a digital signature over a public key and can be verified using the signer's public key. An integrity protected signaling channel is a secure communication channel established between the secure mobility client establishes and the cloud connector 103 using mutual authentication. Examples for the mutual authentication include transport layer security (TLS) handshake and/or using a long-term credential.

In one example, the cloud connector 103 may allow a secure channel on the (LAN) interface connecting to the primary network 105, and ignore any request arriving on the external (WAN) interface of the cloud connector 103. Therefore, the cloud connector 103 is at least partially protected from outside attacks because the IP address and domain name of the cloud connector 103 is exposed to internal hosts only and not to external hosts.

The mobile node 101 is configured to send a request to the cloud connector 103 for an identification of the cloud security server 109 associated with the cloud connector 103. The mobile node 101 is configured to receive the identification of the cloud security server 109.

In one example, the secure mobility client sends a hypertext transfer protocol (HTTP) GET request to the cloud connector 103. The cloud connector 103 generates a reply message. The reply message includes the fully qualified domain name (FQDN) and/or the IP address of the cloud security server 109. The secure mobility client stores the identity of the cloud security server 109 in memory of the mobile device 101.

In another example, the mobile device 101 and the cloud connector 103 use a publish and subscribe mechanism to exchange the identification of the cloud security server 109 associated with the cloud connector 103. The publish and control mechanism is configured to define and create topics and publish information through an event notification broadcasted to all entities that have subscribed to a particular topic. The mobile device 101 is configured to subscribe to information related to a cloud service. The cloud connector 103 publishes messages with information related to the cloud service, including the identification of the cloud security server 109 (e.g., the FQDN and/or the IP address of the cloud security server 109).

The secure mobility client stores the identification of the cloud security server 109. The mobile node 101 is configured to direct a second data flow for a second interface of the mobile node 101 to the cloud security server 103. The second data flow may be data transmitted from the mobile device 101 or to the mobile device 101 or both. For example, the mobile node 101 may be configured to insert an address of the cloud security server 109 into data packets of the second data flow. The second data flow and the second interface are associated with a secondary network 107, which is an external network with respect to the primary network 105. The second interface and the second data flow are transitioned from the cloud service server 108 to the cloud service server 109.

The cloud service server 109 is configured to enforce policies on the subflows (e.g., first data flow and the second data flow). The cloud service server 109 is MPTCP aware. The algorithms described are not limited to two data flows and may be applied to any number of subflows or data flows. The policies may specify acceptable types of data that is transmitted, acceptable domains or websites that are visited, acceptable protocols for transmitting data, and/or acceptable bandwidth or total amounts of data transmitted for the combination of the first data flow and the second data flow. The cloud service server 109 may be configured to identify malicious software formable from packets of the first data flow and packets of the second data flow. The content of packets from both data flows are combined for detection of malicious software.

If the secure mobility client does not detect the presence of the cloud connector 103 in the primary network 105, the secure mobility client may be configured to generate a multipath disabled flag and store the multipath disabled flag in memory. That multipath disabled flag indicates that data flows should not be coordinated. In response to the multipath disabled flag, the mobile device 101 is configured to continue to direct the second data flow on the second interface to the secondary network 107 and the cloud service server 108. In addition, the security mobility client may reject requests for additional subflows on the primary interface and the primary network 105. In response to requests for additional subflows, the mobile device may generate a reply message including the multipath disabled flag.

In one alternative, at the mobile device 101, the secure mobility client or another mobile application includes a cloud connector component 102. When the mobile device 101 connects only to a network with no cloud connector, the cloud connector component 102 directs are traffic to a predetermined security service server (e.g., cloud service server).

In one alternative, the subflow on the second interface to the secondary network 107 (e.g., cellular network) has already been established prior to the mobile device 101 connecting to the primary network 105 (e.g., Wi-Fi network). A mobile application or software application running on the mobile device 101 transitions to multipath communication when connecting to the primary network 105.

If the secure mobility client determines that the secure cloud service server 108 coupled with the secondary network 107 is different that the cloud service server 109 coupled with the primary network 105, the secure mobility client blocks the existing multipath communication session from creating new subflows using the primary interface (e.g., Wi-Fi interface). However, new multipath communication sessions may be established to use both the primary interface and secondary interfaces. In addition, all subflows of new multipath communication sessions are directed to the same server in the cloud based security as a service (e.g., cloud service server 109).

Figure 2:
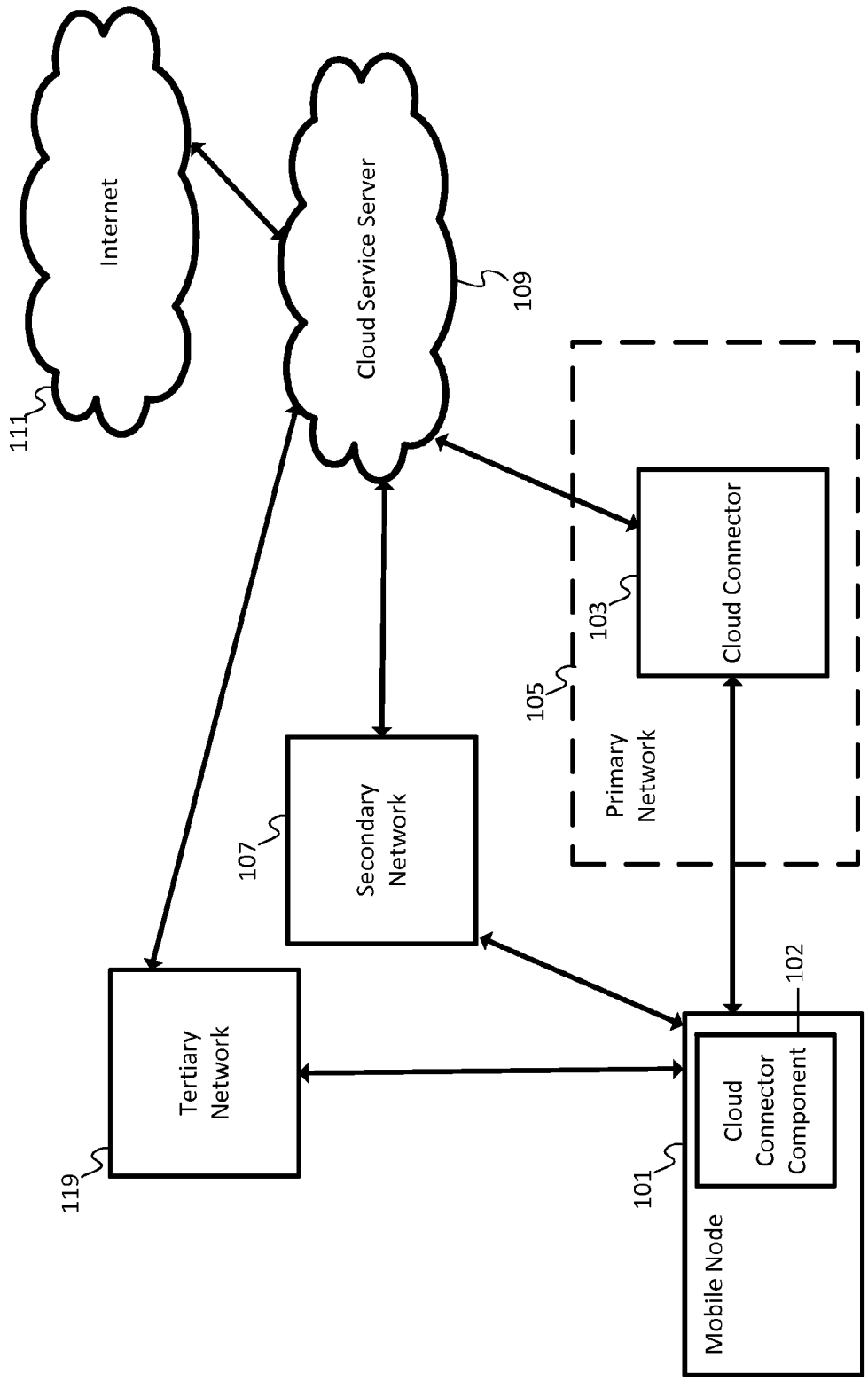
FIG. 2 illustrates another example of a system for multipath communication.

FIG. 2 illustrates another system for multipath communication. The system for multipath communication includes a primary network 105, a secondary network 107, and a tertiary network 119. The mobile device 101 communicates with the primary network 105 on a first interface and/or first type of communication, communicates with the secondary network 107 on a second interface and/or a second type of communication, and communicates with the tertiary network 119 on a third interface and/or a third type of communication. In one example, the primary network 105 is a wired network (e.g., Ethernet), the secondary network 107 is a wireless network (e.g., IEEE 802.11 family of standards), and the tertiary network 119 is a cellular network (e.g., 3G, 4G, 4G-LTE, or later developed mobile standards). Alternatively, the secondary network 107 or the tertiary network 119 may communicate using access technologies such as WiMAX, 3rd Generation Partnership Project (3GPP) standards, 3GPP2 and WLAN based access architectures.

The mobile device 101 detects the cloud connector 103 through the connection with the primary network 105. The connection with the primary network 105 may be a wired network or a wireless network. The mobile device 101 is configured to establish multipath communication by adding a parallel flow of data using the secondary network 107 and/or the tertiary network 119. However, neither the secondary network 107 nor the tertiary network 119 is initially aware of the cloud service server 109 used by the primary network. The mobile device 101 queries the primary network 105 (e.g., the cloud connector 103) to for an identification of the cloud security server 109 associated with the cloud connector 103 and the primary network 105.

The mobile device 101 directs a first parallel flow of data using the secondary network 107 and a second parallel flow of data using the tertiary network 119 to the cloud security server 109. In one example, the primary network 105 is a wired connection to the enterprise, the secondary network 107 is a cellular network, and the tertiary network 119 is a wireless connection to the enterprise. In another example, the primary network 105 is a wireless connection to the enterprise, the secondary network 107 is a cellular network, and the tertiary network 119 is a USB, Bluetooth, or another connection to another computing system connected to another network. Any one of the cellular network, the wireless network, or the connection to another computing system may be referred to as a complementary network with respect to the primary network 105. Any interface that is not connected to the primary network connects to the complementary network. For example the mobile device 101 may use multiple interfaces (e.g., 3G, Public Wife, VPN connectivity to the primary network). In the above example there could be multiple sub-flows. Some of the sub-flows are sent through the primary network (VPN), the rest through the untrusted networks (3G, Public Wi-Fi, or other complementary networks).

In one scenario, the mobile device 101 first connects to the primary network 105 and subsequently travels out of the geographic range of the primary network 105. When the mobile device 101 roams out of the enterprise premises, the mobile device 101 switches over to the secondary network 107 (e.g., 3G interface and cellular network). The secure mobility client may use the address from the 3G interface for establishing the multipath communication. The security mobility client may have already identified the cloud service server 109, as described above. During roaming and/or upon return to the enterprise premises, the secure mobility client is configured to send data traffic to the cloud service server 109, which ensures that even after failover, the multipath communication session is redirected to the same cloud service server.

Figure 3:
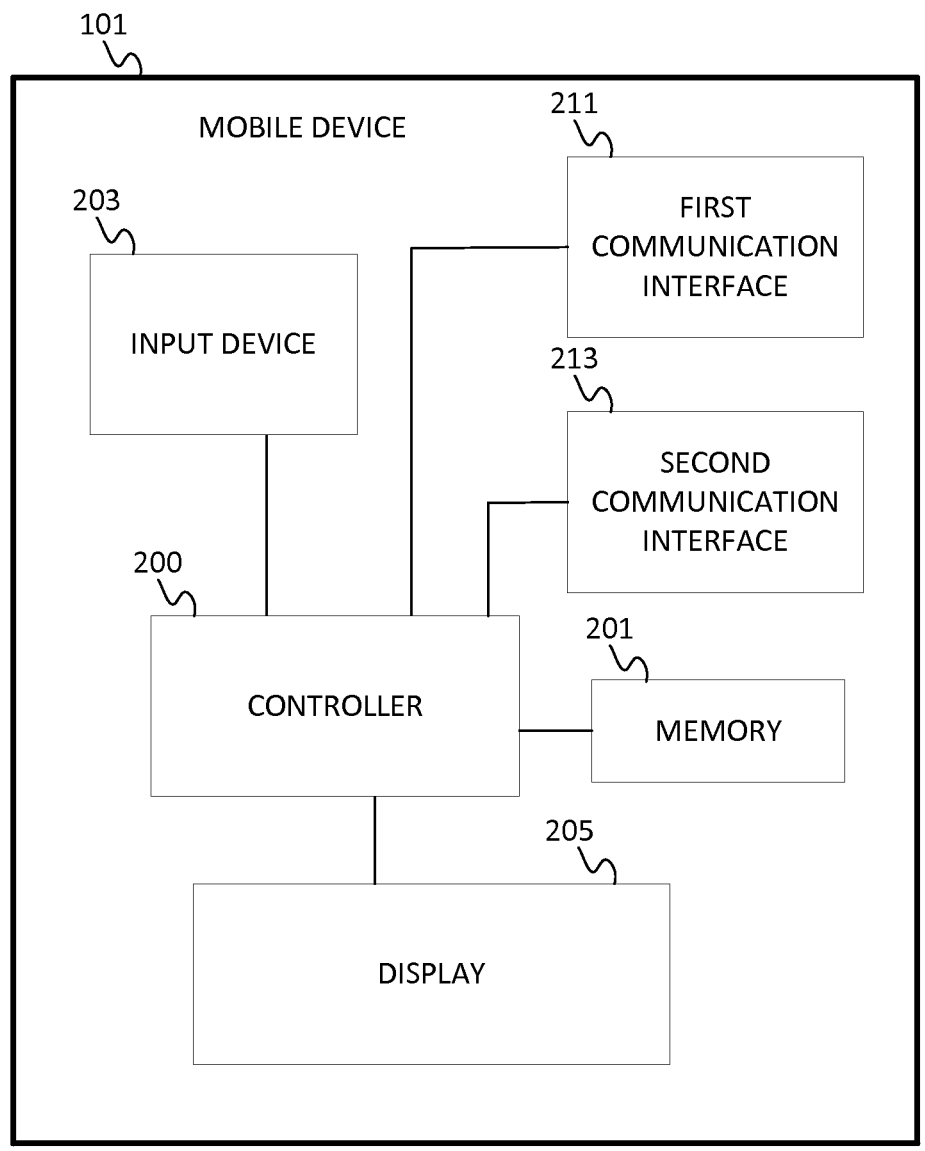
FIG. 3 illustrates an example mobile device for the systems of FIG. 1 of FIG. 2.

FIG. 3 illustrates an example mobile device 101 for the systems of FIG. 1 of FIG. 2. The mobile device 101 includes a controller 200, a memory 201, an input device 203, a first communication interface 211, a second communication interface 213, and a display 211. Additional, different, or fewer components may be provided. Different network devices may have the same or different arrangement of components.

Figure 4:
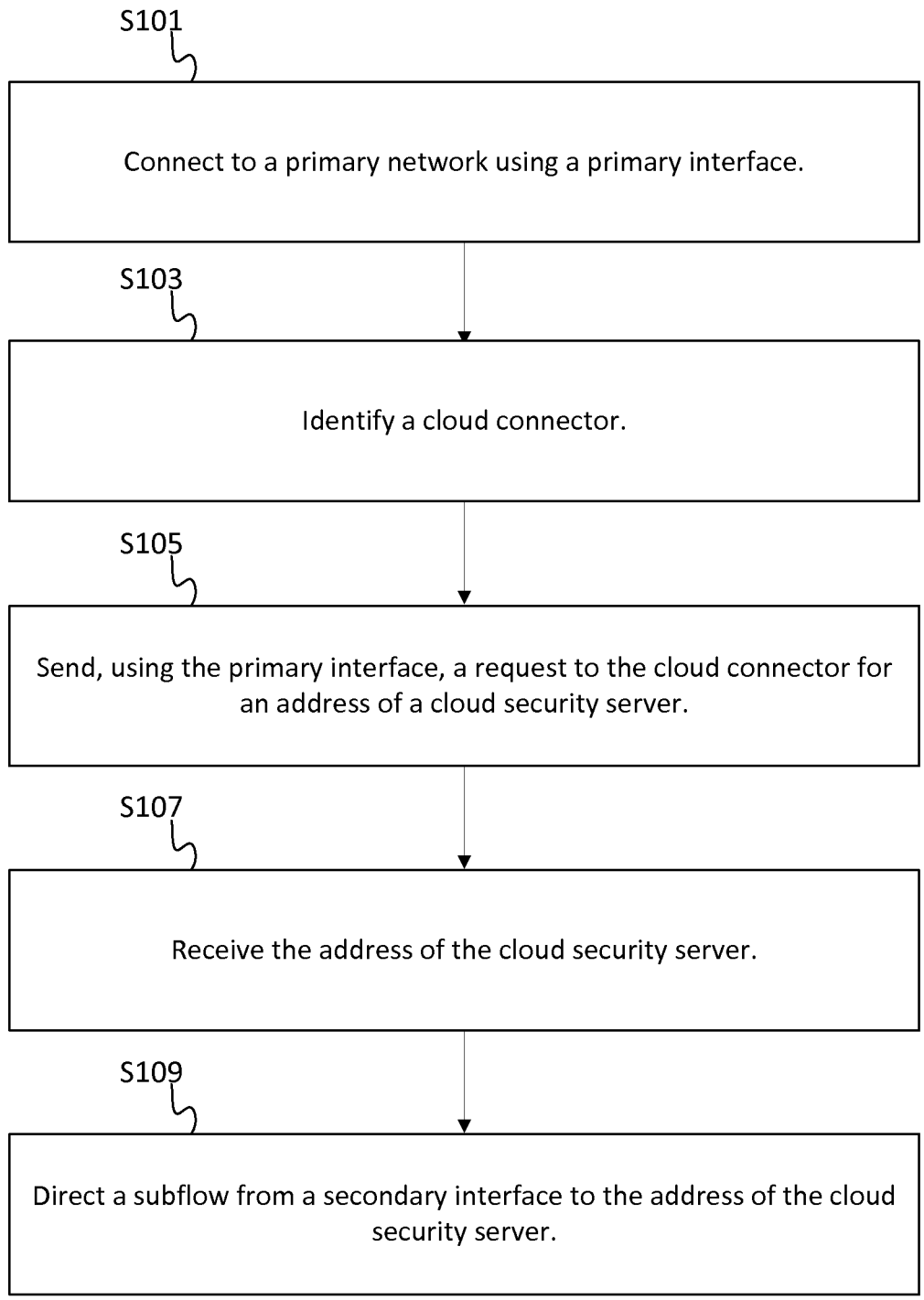
FIG. 4 illustrates an example flowchart for multipath communication by the mobile device of FIG. 3.

FIG. 4 illustrates an example flowchart for multipath communication by the mobile device of FIG. 3. Additional, different, or fewer acts may be provided. The acts are performed in the order shown or other orders. The acts may also be repeated.

The first communication interface 211 is configured to communicate with a primary network such as an enterprise network or another trusted network. The second communication interface 213 configured to communicate with a complementary network such as a cellular network, a microwave network, or another network outside of the primary network. The complementary network may also be an additional type of connection to the primary network.

At act S101, the controller 200 establishes a connection through the first communication interface 211 with the primary network. At act S103, the controller identifies a cloud connector. In one example, act S103 may include detection of a trusted network presence. The mobile device 101 may attempt to reach a secure web address or internal network address that would only be accessible through the trusted network. If the mobile device 101 is able to reach the secure web address or internal network address and can access a certificate from a server associated with the secure web address or internal network address, the mobile device 101 has detected the trusted network presence.

At act S105, the controller 200 generates and sends a request to the cloud connector through the first communication interface 211 and the primary network for an address (e.g., domain name or IP address) of a security server associated with the trusted network. The request may be generated as part of a discovery processor. At act S107, the controller 200 receives the address of the cloud security server.

At act S109, the controller 200 directs or redirects a one or more data subflows through the second communication interface 213 and the complementary network to the same security server used by the primary network. For example, the controller 200 may replace the destination address with the address of the security server into packets of the second data flow so that the flow is re-directed to the security server. The controller 200 may re-direct a subflow of a multipath communication session that already exists, or the controller 200 may be defining initialization of a new subflow. The controller 200 may provision, organize, and manage the subflows of the multipath communication session as part of a multipath mode. The multipath mode may be a kernel mode that runs within the operating system automatically. The multipath mode may be a user configurable mode that the user selects. The user configurable mode may store and/or display the setting of the subflows including the designation of the security server.

The input device 203 may be one or more buttons, keypad, keyboard, mouse, stylist pen, trackball, rocker switch, touch pad, voice recognition circuit, or other device or component for inputting data to the mobile device 101. The input device 203 and the display 211 may be combined as a touch screen, which may be capacitive or resistive. The display 211 may be a liquid crystal display (LCD) panel, light emitting diode (LED) screen, thin film transistor screen, or another type of display.

The mobile device 101 may also include a positioning device that employs a Global Positioning System (GPS), Global Navigation Satellite System (GLONASS), or a cellular or similar position sensor for providing location data. The cloud service server 109 may be selected based on a geographic position of the mobile device 101 or the cloud connector 103. The cloud service servers may also be selected based on the administration of the respective networks. Some networks may automatically connect to a specific cloud service server based on a subscription, agreement, or license.

Figure 5:
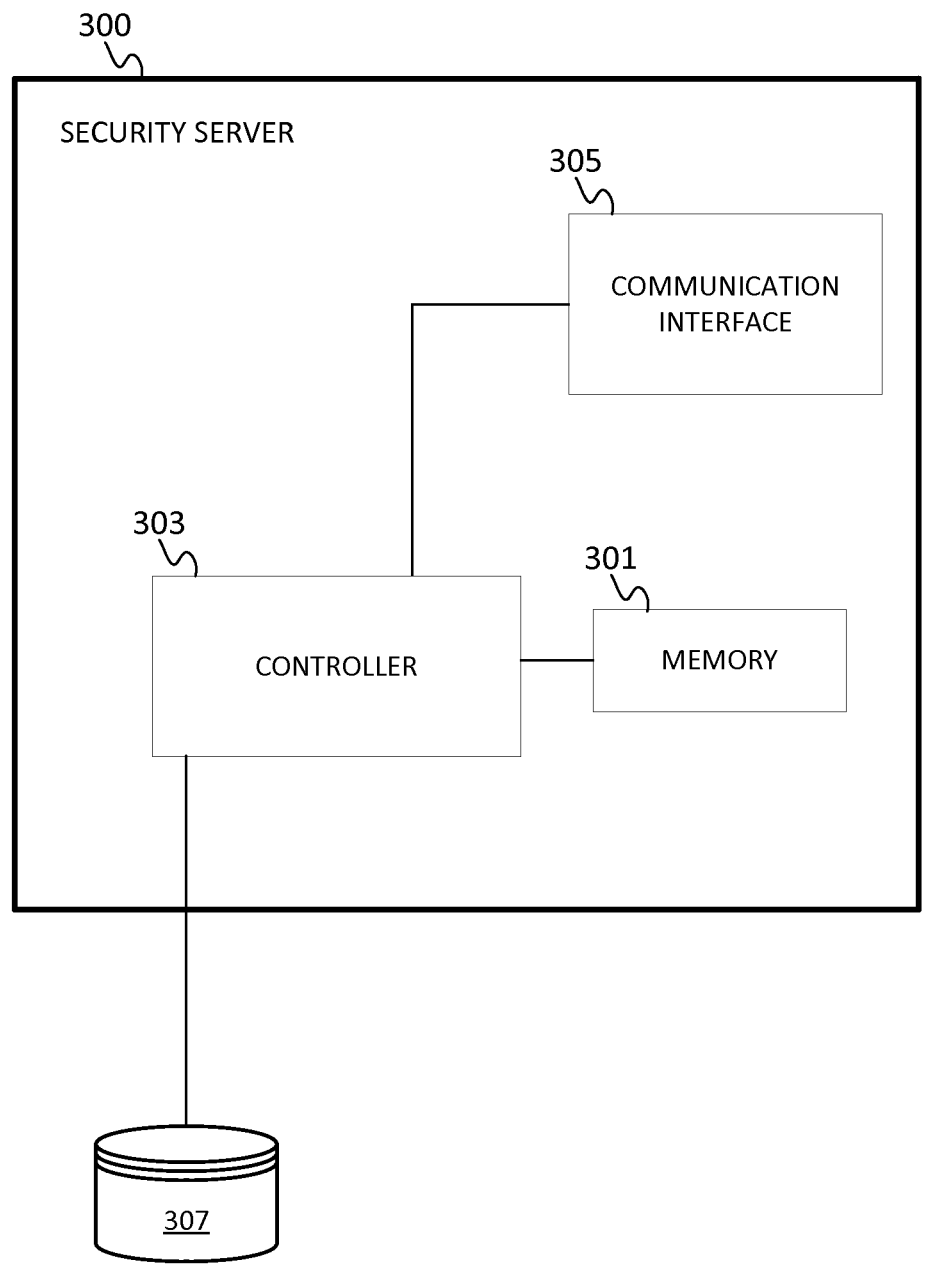
FIG. 5 illustrates an example security server for the systems of FIG. 1 of FIG. 2.

FIG. 5 illustrates an example security server for the systems of FIG. 1 of FIG. 2. The network device 300 may correspond to the cloud service server 108 or the cloud service server 109. The network device 300 includes at least a memory 301, a controller 303, and a communication interface 305. In one example, a database 307 stores the policy profiles for security as a service. Additional, different, or fewer components may be provided. Different network devices may have the same or different arrangement of components.

Figure 6:
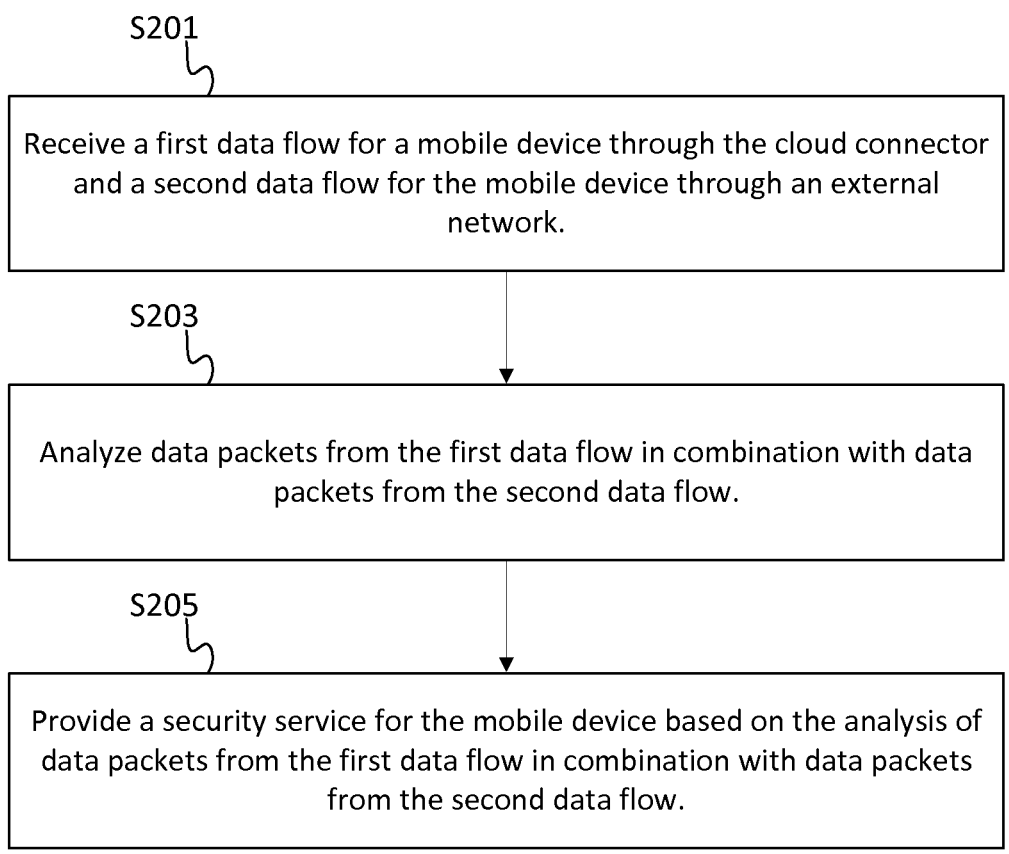
FIG. 6 illustrates an example flowchart for multipath communication through the example security server of FIG. 5.

FIG. 6 illustrates an example flowchart for multipath communication through the example security server of FIG. 5. Additional, different, or fewer acts may be provided. The acts are performed in the order shown or other orders. The acts may also be repeated.

At act S201, the controller 303 or communication interface 305 receives a first data flow for a mobile device through the cloud connector and a second data flow for the mobile device through an external network. The first data flow and the second data flow take different paths to the network device 303. The paths may be through different Internet providers and/or different cloud service providers.

At act S203, the controller 303 performs an analysis of data packets from the first data flow in combination with data packets from the second data flow and/or other data flows. The two or more flows are combined to identify all of the content sent to or received from the mobile device. At act S205, the controller 303 provides a security service for the mobile device based on the analysis of data packets from the first data flow in combination with data packets from the second data flow.

The security service may include malicious software blocking, content filtering, and statistics gathering. Security services provide malicious software blocking as protection against viruses, spyware, and other malware that targets the mobile nodes. Security services provide content filtering to limit the types of content received at the mobile node. The content filtering may be based on parental controls, or specifically tailored filtering for mobile hotspots or public networks. The content filtering may be based on a user profile. A security service may be configured to identify impermissible content from a data file formed from data packets from multiple subflows in multipath communication.

Security services provide statistics gathering by counting data flows. For example, a number of packets or a quantity of data in a flow may be counted and reported for network analytics. A security service may be configured to gather statistics from multiple subflows in multipath communication. Alternatively or in addition, the security service may provide spam filtering. The security service may include an email filter. The email filter may include criteria such as keywords, address munging, and a list of known spammers.

Alternatively or in addition, the security service may regulate data limits. The mobile device 101 may be allocated a maximum data allowance across all flows in the multipath. The controller 303 is configured to compare the maximum data allowance to a combined size of the data flows (e.g., first data flow and the second data flow). When the combined size of the data flows exceed the maximum data allowance, the controller 303 is configured to block or rate limit additional content from the mobile device 101. The block may prohibit data from being sent by the mobile device 101, data from being received by the mobile device 101, or both.

The security service may be a cloud based security as a service (SECAAS). SECAAS is an example. The security service could be another system to control flows through multiple interfaces. For example, the security service may listen to the flows of mobile device for the purposes of eavesdropping or statistics gathering. The security service may be any software as a service (SAAS).

The controllers 200 and 303 may include a general processor, digital signal processor, an application specific integrated circuit (ASIC), field programmable gate array (FPGA), analog circuit, digital circuit, combinations thereof, or other now known or later developed processor. The controllers 200 and 303 may be a single device or combinations of devices, such as associated with a network, distributed processing, or cloud computing.

The memories 201 and 301 may be a volatile memory or a non-volatile memory. The memories 201 and 301 may include one or more of a read only memory (ROM), random access memory (RAM), a flash memory, an electronic erasable program read only memory (EEPROM), or other type of memory. The memories 201 and 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   connecting to a primary network through a primary interface of a mobile device;
   identifying a cloud connector through the primary interface of the mobile device;
   sending, using the primary interface, a request to the cloud connector for an address of a cloud security server associated with the cloud connector;
   receiving the address of the cloud security server; and
   directing a subflow from a secondary interface of the mobile device to the cloud security server, identified through the primary interface, through a complementary network, wherein the cloud security server is configured to identify malicious software formed from a combination of packets of the first data flow and packets of the second data flow.

2. The method of claim 1, wherein the primary network is a local area network, and the mobile device is authenticated on the local area network.

3. The method of claim 2, wherein the complementary network is a cellular network or a public wireless network.

4. The method of claim 1, wherein the cloud security server is selected based on a geographic position of the mobile device or the cloud connector.

5. The method of claim 1, wherein in the request is formatted as a hypertext transfer protocol GET command.

6. The method of claim 1, wherein directing the subflow to the cloud security server comprises: inserting the address of the cloud security server into packets of the subflow.

7. The method of claim 1, wherein the cloud security server is configured to enforce one or more usage policies on the first data flow and the second data flow.

8. An apparatus comprising:
   a first communication interface configured to communicate with a first network;
   a second communication interface configured to communicate with a second network, wherein the second communication interface and the second network are associated with an external provider;
   a controller configured to generate a request to a cloud connector through the first communication interface and the first network for an identification of a cloud server associated with the cloud connector and direct a subflow through the second communication interface and the second network to the cloud server identified through the first network, wherein the cloud server is configured to identify malicious software formable from a combination of packets of the first data flow and packets of the second data flow.

9. The apparatus of claim 8, wherein the first network is a local area network and the second network is a cellular network.

10. The apparatus of claim 8, wherein the cloud server is configured to enforce one or more usage policies on the first data flow and the second data flow.

11. A method comprising:
    receiving a first data flow for a mobile device through a cloud connector;
    receiving a second data flow for the mobile device through an a different service provider;
    performing an analysis of data packets from the first data flow in combination with data packets from the second data flow; and
    providing a cloud security service for the mobile device based on the analysis of data packets from the first data flow in combination with data packets from the second data flow, wherein the cloud security service identifies malicious software from a data file formed from data packets from the first data flow in combination with data packets from the second data flow.

12. The method of claim 11, wherein the cloud security service enforces one or more usage policies on the first data flow and the second data flow.

13. The method of claim 11, wherein the cloud security service identifies impermissible content from a data file formed from data packets from the first data flow in combination with data packets from the second data flow.

14. The method of claim 11, further comprising: comparing a maximum threshold for the mobile device to a combination of the first data flow and the second data flow; and blocking additional content when the combination of the first data flow and the second data flow exceeds the maximum threshold.

15. An apparatus comprising:
    a memory configured to store a usage policy associated with a mobile device;
    a communication interface configured to receive a first data flow from the mobile device through a primary network and a second data flow from the mobile device from a complementary network; and a controller configured to perform an analysis of data packets from the first data flow in combination with data packets from the second data flow and provide a security service for the mobile device based on the analysis of data packets from the first data flow in combination with data packets from the second data flow, wherein the controller is configured to identify malicious software formable from the analysis of data packets from the first data flow in combination with data packets from the second data flow.

16. The apparatus of claim 15, wherein the controller is configured to compare a maximum data allowance to a combined size of the first data flow and the second data flow.

* * * * *